United States Patent [19]

Asano et al.

[11] Patent Number: 4,609,292

[45] Date of Patent: Sep. 2, 1986

[54] DEVICE AND METHOD FOR MEASURING A TEMPERATURE DIFFERENCE

[75] Inventors: Masaharu Asano, Fujisawa; Yoshihisa Kawamura; Toyoaki Nakagawa, both of Yokosuka, all of Japan

[73] Assignee: Nissan Motor Company, Limited, Japan

[21] Appl. No.: 430,727

[22] Filed: Sep. 30, 1982

[30] Foreign Application Priority Data

Nov. 2, 1981 [JP] Japan .................. 56-174555

[51] Int. Cl.$^4$ .................. G01M 15/00; G01K 13/00
[52] U.S. Cl. .................. 374/144; 123/198 R; 364/571; 374/147; 374/170
[58] Field of Search .............. 374/144, 145, 148, 142, 374/166, 113, 170, 179, 172, 173; 364/571; 330/289

[56] References Cited

U.S. PATENT DOCUMENTS

| | | | |
|---|---|---|---|
| 3,101,617 | 8/1963 | Brinson | 374/113 |
| 3,472,068 | 10/1969 | List et al. | 374/144 X |
| 3,618,386 | 11/1971 | Black | 374/144 |
| 3,683,683 | 8/1972 | Demidov et al. | 374/145 X |
| 3,710,350 | 1/1973 | Yoshitake | 371/25 X |
| 3,719,071 | 3/1973 | Hohenberg | 374/144 X |
| 3,882,451 | 5/1975 | Fujishiro et al. | 374/144 X |
| 3,906,796 | 9/1975 | Dumbeck | 374/144 |
| 3,939,711 | 2/1976 | Hanaoka | 374/144 X |
| 3,990,308 | 11/1976 | McCormick | 374/144 X |
| 4,060,065 | 11/1977 | Hata | 123/571 |
| 4,096,575 | 6/1978 | Itoh | 364/571 |
| 4,102,199 | 7/1978 | Tsipouras | 374/172 X |
| 4,119,070 | 10/1978 | Asano | 371/25 X |
| 4,169,243 | 9/1979 | Payne et al. | 374/172 |
| 4,179,745 | 12/1979 | Wuertele | 364/571 |
| 4,193,039 | 3/1980 | Massa et al. | 364/571 X |
| 4,198,676 | 4/1980 | Vamum et al. | 374/170 X |
| 4,211,113 | 7/1980 | Harrison | 374/179 X |
| 4,224,466 | 9/1980 | Bush | 364/579 |
| 4,254,469 | 3/1981 | Whitely | 364/571 |
| 4,293,916 | 10/1981 | Del Re | 364/571 |
| 4,315,243 | 2/1982 | Calvert | 374/144 |
| 4,364,027 | 12/1982 | Muroaka | 364/561 X |
| 4,423,487 | 12/1983 | Buckenham et al. | 364/571 X |
| 4,423,967 | 1/1984 | Mouton | 374/179 X |
| 4,437,164 | 3/1984 | Branch, III | 364/571 |

FOREIGN PATENT DOCUMENTS

| | | | |
|---|---|---|---|
| 0970593 | 7/1975 | Canada | 374/144 |
| 0773464 | 10/1980 | U.S.S.R. | 374/144 |

OTHER PUBLICATIONS

"A Temperature Compensating Method for Log. Amplifier", K. Kawashima, (pp. 25-32) IEEE Trans. Nucl. Sci. (USA) vol. AS-17 (#5) (10/1970).

Primary Examiner—Daniel M. Yasich
Attorney, Agent, or Firm—Lane and Aitken

[57] ABSTRACT

A device and method for measuring a temperature difference at different positions which cancels offset voltages produced by a temperature sensitive element, e.g., a thermocouple used in the device and the device itself. The device comprises: (a) an amplifier for receiving and amplifying the output signal produced by the temperature sensitive element and output ting a voltage corresponding to a sensed temperature difference; (b) a comparator for determining that the output signal of the temperature sensitive element should be zero level by sensing a condition that the temperature difference between the two different positions is zero; (c) a memory for storing the value of the voltage of the amplifying means outputted when the comparator determines that the output signal of the temperature sensitive element should be at a zero level; and (d) means for subtracting the stored voltage value in the memory from the current output voltage value of the amplifier so as to obtain a modified output voltage value accurately corresponding to the current temperature difference free from offset voltage errors.

13 Claims, 7 Drawing Figures

DEVICE AND METHOD FOR MEASURING A TEMPERATURE DIFFERENCE

BACKGROUND OF THE INVENTION

1. Field of the Invention

The present invention relates generally to an improved temperature difference measurement device and method and more specifically to a temperature difference measurement device and method using a temperature sensitive element which eliminates the adverse effects of offset and inherent characteristic unevenness and the variation in the temperature sensitive element and measurement device itself caused by aging which are detrimental to the accuracy of the device's measurements.

2. Description of the Prior Art

A conventional temperature difference measurement device, a part of which is shown in FIG. 1, comprises: (a) a temperature difference sensor, such as a thermocouple; (b) a processing circuit 1 having a plurality of operational amplifiers $OP_1$, $OP_2$ and $OP_3$ and resistors $R_0$ through $R_6$ which receives and amplifies the signal at terminals $V^+$ and $V^-$ that was generated by the temperature difference sensor, e.g., a thermoelectromotive force in response to a temperature difference, and outputs a voltage E corresponding to the measured difference in temperature; and (c) a measuring instrument (not shown in FIG. 1) which displays the measured difference in temperature, e.g., by means of a pointer, in response to the output voltage value E of the processing circuit 1.

The processing circuit 1 described above comprises: (a) a first operational amplifier $OP_1$ having a noninverting input terminal (+) connected to one terminal $V^-$ of the thermocouple to receive the thermoelectromotive force generated by the thermocouple and connected to a constant voltage supply $V_0$ via a first resistor $R_0$, an inverting input terminal (−) connected to the constant voltage supply $V_0$ via a second resistor $R_1$, and an output terminal connected to the inverting input terminal via a third resistor $R_2$: (b) a second operational amplifier $OP_2$ having a noninverting input terminal (+) connected to the other terminal $V^+$ of the thermocouple to receive the thermo electromotive force generated by the thermocouple, an inverting input terminal (−) connected to the output terminal of the first operational amplifier $OP_1$ via a fourth resistor $R_3$, and an output terminal connected to the inverting input terminal thereof (−) via a fifth resistor $R_4$; and (c) a third operational amplifier $OP_3$ having a noninverting input terminal (+) connected to the output terminal of the second operational amplifier $OP_2$, an inverting input terminal (−) connected to ground via a sixth resistor $R_5$, and an output terminal connected to the inverting input terminal (−) via a seventh resistor $R_6$.

In the processing circuit 1 described above, if a ratio of each resistor is expressed as $\alpha = R1/R2 = R4/R3$, $\beta = R6/R5$, and if $w_1$, $w_2$, and $w_3$ are respective offset voltages of the first, second, and third operational amplifiers $OP_1$, $OP_2$, $OP_3$, the output voltage $\mu_1$ of the first operational amplifier $OP_1$ and the output voltage $\mu_2$ of the second operational amplifier $OP_2$ are expressed, respectively, in the equations:

$$\mu_1 = (1/\alpha)(V^- - V_0 + w_1) + V^- + w_1 \qquad (1)$$

$$\mu_2 = \alpha(V^+ - \mu_1 + w_2) + V^+ + w_2 \qquad (2)$$

In addition, the output voltage E of the processing circuit 1 is expressed in the equation:

$$E = (1+\beta)(\mu_1 + w_3) \qquad (3)$$

From these three equations (1), (2), and (3), the output voltage E can be rearranged so that:

$$E = (1+\alpha)(1+\beta)(V^+ - V^-) + (1+\beta)\{(-1+\alpha)(w_2 - w_1) + w_3 + V_0\} \qquad (4)$$

wherein $(1+\alpha)$ and $(1+\beta)$ are amplification factors of the associated operational amplifiers.

In the equation (4) expressed above, the first right-hand item indicates a theoretical amplified voltage value corresponding to the thermoelectromotive force produced by the difference in temperature, and the second right-hand item indicates an error voltage including each offset error voltage of the operational amplifiers. It should be noted that because of unevenness in thermoelectromotive force characteristic of each thermocouple, the first right-hand item inherently includes yet another offset error voltage factor such that the difference between the positive and negative sides of the thermocouple $(V^+ - V^-)$ is not zero even when the temperature of both junctions of the thermocouple is 0° C.

Nonetheless, conventional temperature difference measurement devices simply amplify the absolute value of thermoelectromotive force produced by the thermocouple, $|V^+ - V^-|$. This ignores the fact that the operating characteristic of the processing circuit 1 changes depending on the value of the circuit parameters $\alpha$, $\beta$, and $V_0$ described above and the respective offset voltages $w_1$, $w_2$, and $w_3$ of the first, second, and third operational amplifiers $OP_1$, $OP_2$, and $OP_3$ which are determined by the operating characteristics of each circuit component used in the processing circuit 1.

In summary, the following three factors cause the change in the measured result of a difference in temperature: (x) an unevenness and drift in an output characteristic of the thermocouple used for the temperature sensitive element caused by aging; (y) the unevenness and dispersion in set circuit parameters built in during mass production of the devices; and (z) an unevenness and variation in the output characteristic of the circuit components caused by aging. In particular, the factor described at (y), which includes the effect of the offset voltages described hereinabove readily produces large errors in the output voltage E of the processing circuit 1. Consequently, measurement of a difference in temperature by such devices is likely to be inaccurate.

SUMMARY OF THE INVENTION

With the above-described problem in mind, it is an object of the present invention to provide an accurate temperature difference measurement device and method, wherein an offset error produced by a temperature difference sensor used in the device that does not indicate a zero difference even when the temperature around the temperature difference sensor elements is at 0° C., and another offset error produced by a processing circuit which receives and amplifies the output signal from the temperature difference sensor elements and produces an output according to the measured temperature difference, are cancelled by subtracting an output correction value. The output correction value is produced by the processing circuit when the value of the output from the temperature difference sensor should be zero from the value of the current output of the processing circuit, so as to provide a modified value accurately corresponding to the measured temperature difference.

This correction is achieved by providing means for determining that the value of the output from the temperature difference sensor should be at a zero level by sensing a predetermined condition that precludes a temperature difference between the different positions at which the measurement is taken, means for storing the value of the output from the processing circuit when the sensing means senses that the output of the temperature difference sensor should have a zero value, and means for subtracting the stored value from the current value of the output.

BRIEF DESCRIPTION OF THE DRAWINGS

The features and advantages of the present invention will be better appreciated when the foregoing description is considered in conjunction with the accompanying drawings wherein like reference numerals designate corresponding elements, and in which.

DETAILED DESCRIPTION OF THE PREFERRED EMBODIMENTS

Reference will be made hereinafter to the accompanied drawings in order to facilitate understanding of the present invention.

Figure 1:
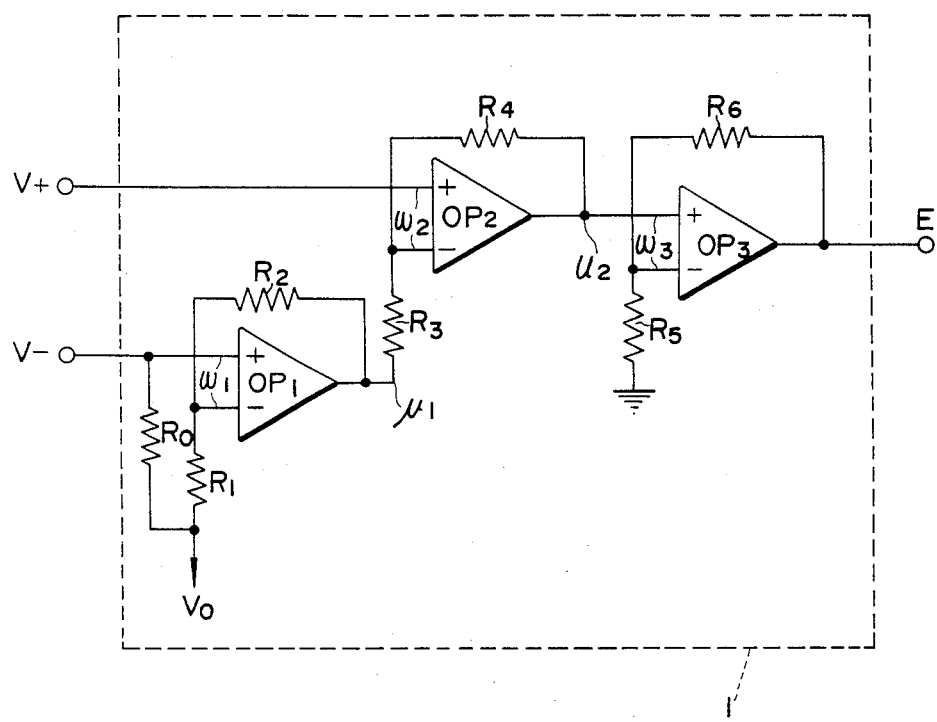
FIG. 1 is a circuit diagram showing a processing circuit of a conventional temperature difference measurement device.

FIG. 1 shows a processing circuit 1 of a conventional temperature difference measurement device. In FIG. 1, a thermocouple (not shown) used as a temperature sensitive element is connected to the processing circuit 1. A thermoelectromotive force is generated when there is a temperature difference between two junctions of different kinds of metals. A negative side of the thermocouple $V^-$ is connected to the processing circuit 1 at a noninverting input terminal (+) of a first operational amplifier $OP_1$. A positive side of the thermocouple $V^+$ is also connected to the processing circuit 1 at a noninverting input terminal (+) of a second operational amplifier $OP_2$. Thus the thermoelectromotive force $V^+ - V^-$ produced by the thermocouple is applied to the noninverting input terminals (+) of the first operational amplifier $OP_1$ and the second operational amplifier $OP_2$.

A constant voltage $V_0$ is also applied to the inverting input terminal (−) of the first operational amplifier $OP_1$ via a second resistor $R_1$ and the noninverting input terminal (+) thereof via a first resistor $R_0$. A third resistor $R_2$ is inserted between the inverting input terminal (−) and the output terminal of the first operational amplifier $OP_1$. The first operational amplifier $OP_1$ acts as a differential amplifier. An inverting input terminal (−) of the second amplifier $OP_2$ is connected to the output terminal of the first operational amplifier $OP_1$ via a fourth resistor $R_3$ and to the output terminal thereof via a fifth resistor $R_4$. The second operational amplifier $OP_2$ also acts as another differential amplifier. The output terminal of the second operational amplifier $OP_2$ is connected to a noninverting input terminal (+) of a third operational amplifier $OP_3$.

An inverting input terminal (−) of the third operational amplifier $OP_3$ is grounded via a sixth resistor $R_5$ and connected to the output terminal thereof via a seventh resistor $R_6$. The third operational amplifier $OP_3$ outputs a voltage E corresponding to the temperature difference sensed by the thermocouple (not shown in FIG. 1). The third operational amplifier $OP_3$ acts as a noninverting amplifier. The first, second, and third operational amplifiers $OP_1$, $OP_2$, and $OP_3$ have their own offset voltages $w_1$, $w_2$, and $w_3$, respectively. In the construction of the processing circuit 1 described above, an output voltage $\mu_1$ of the first operational amplifier $OP_1$ can be expressed by such a first equation as:

$$\mu_1 = -\frac{R2}{R1} V_0 + \frac{R1 + R2}{R1}(V^- + w_1) \quad (1)$$

$$= -\frac{1}{\alpha} V_0 + \left(1 + \frac{1}{\alpha}\right)(V^- + w_1)$$

$$= \frac{1}{\alpha}(V^- - V_0 + w_1) + V^- + w_1$$

wherein $\alpha = R1/R2$. An output voltage $\mu_2$ of the second operational amplifier $OP_2$ can be expressed by such a second equation as:

$$\mu_2 = \alpha(V^+ - \mu_1 + w_2) + V^+ + w_2 \quad (2)$$

wherein $\alpha = R4/R3$. The output voltage E of the processing circuit 1 can be expressed by such a third equation as:

$$E = (1+\beta)(\mu_2 + w_3) \quad (3)$$

wherein $\beta = R6/R5$.

Consequently, the third equation (3) can also be arranged by substituting the first and second equations (1) and (2) thereinto to obtain such a fourth equation as:

$$E = (1+\alpha)(1+\beta)(V^+ - V^-) + (1+\beta)\{(-1+\alpha)(w_2 - w_1) + w_3 + V_0\} \quad (4)$$

In the fourth equation described above, the right first item corresponds to a measured difference in temperature and the right second item corresponds to an offset voltage error. The conventional temperature difference measurement device uses the fourth equation. Again it should be noted that the first right-hand item of the fourth equation (4) describing these measuring devices inherently includes another offset voltage error such that a difference between the positive and negative sides of the thermoelectromotive force $(V^+ - V^-)$ is not zero when the temperature surrounding the thermocouple is at 0° C. due to unevenness in a thermoelectromotive-force characteristic of the thermocouple used therein.

Figure 2:
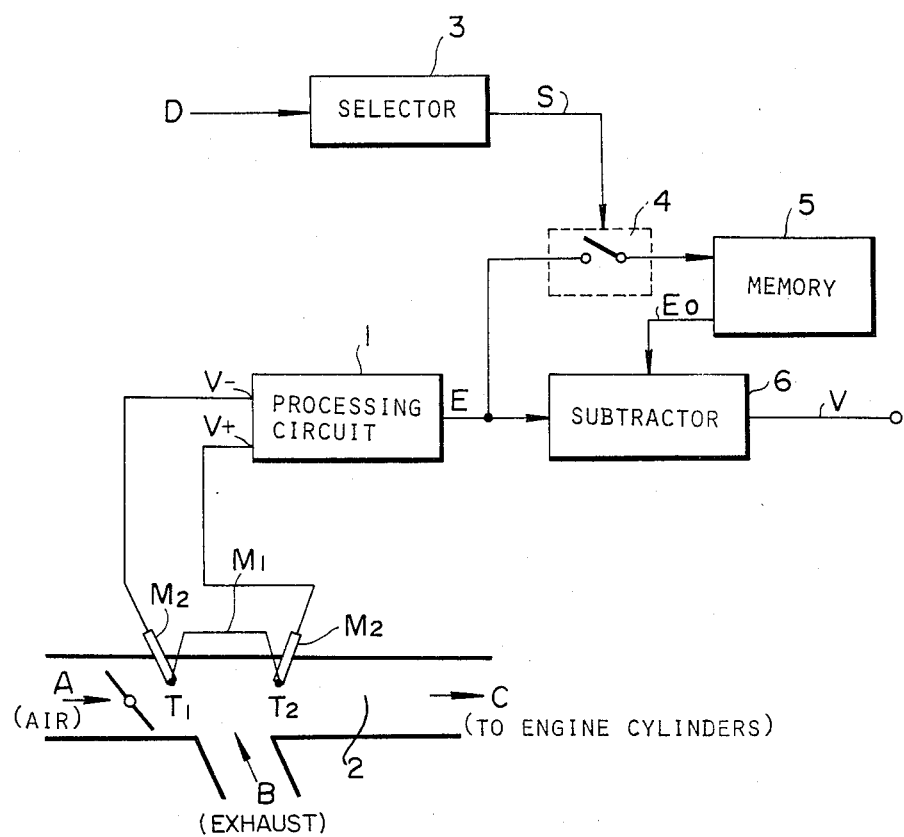
FIG. 2 is a simplified block diagram showing a first preferred embodiment of the temperature difference measurement device according to the present invention.

FIG. 2 shows a first preferred embodiment according to the present invention wherein the temperature difference measurement device is applied to an intake pipe of an internal combustion engine for controlling an amount of exhaust gas recirculation. In FIG. 2 numeral 1 denotes the processing circuit an internal construction of which is the same as shown in FIG. 1, numeral 2 denotes an intake pipe of the internal combustion engine, numeral 3 denotes a selector, numeral 4 denotes a drive switch, numeral 5 denotes a memory, numeral 6 denotes a subtractor, symbols $M_1$ and $M_2$ denote two different kinds of metals constituting the thermocouple, symbols $T_1$ and $T_2$ denote temperatures of intake air of the engine from an outside thereof and of intake air intermixed with exhaust gas, symbol A with an arrow denotes a direction of intake air within the intake pipe 2, symbol B with an arrow denotes a direction of exhaust gas recirculation, and the symbol C with an arrow denotes the direction of the flow of intake air intermixed with exhaust gas toward the engine cylinders.

A first junction of the thermocouple is located at an upstream position in the intake air pipe for measuring $T_1$, the temperature of the intake air from outside of the engine. A second junction thereof is located at a downstream position in the intake air pipe 2 for measuring $T_2$, the temperature of the combination of intake air intermixed with exhaust gas from the engine. A thermoelectromotive force ($V^+ - V^-$) is thus generated according to a temperature difference $\Delta T$ between the first and second junctions of the thermocouple ($\Delta T = T_2 - T_1$). This phenomenon is commonly known as the Seebeck effect. The thermocouple M1, M2 thus constitutes a means for sensing temperature difference between the upstream and downstream positions and for producing an output according to the temperature difference. The amount of exhaust gas recirculation to the engine is controlled on a basis of the temperature difference.

Each end of the thermocouple, the metal $M_2$, is connected to the processing circuit 1 that produces the output voltage E which is the thermoelectromotive force described hereinabove. The output voltage E of the processing circuit 1 is subsequently sent to the subtractor 6 and to the switch 4.

The selector 3, to be described later in detail, determines that the thermoelectromotive force ($V^+ - V^-$) of the thermocouple should be zero by sensing engine parameter signals D indicating a condition that precludes a temperature difference between the upstream $T_1$ and downstream $T_2$ positions ($\Delta T$ is zero) and outputs a selection signal S accordingly. The selector 3 accordingly, is a means for sensing a predetermined condition which, if the predetermined condition is satisfied, always indicates no temperature difference between the junctions of the thermocouple. The selector 3 can also be characterized as a determination means that determines that the output of a sensor means in the form of the thermocouple should be zero. The switch 4 which is normally open closes when the selection signal S is received, whereupon the memory 5 reads and stores the current voltage value E outputted by the processing circuit 1, which then becomes the output correction voltage $E_0$. Thereafter, the subtractor 6 receives the current stored voltage value $E_0$ from the memory 5 together with the current output voltage value E from the processing circuit 1 and performs the subtracting operation expressed in the equation:

$$E - E_0 = V$$

wherein V indicates a modified voltage value accurately corresponding to the measured temperature difference $\Delta T$.

Figure 4:
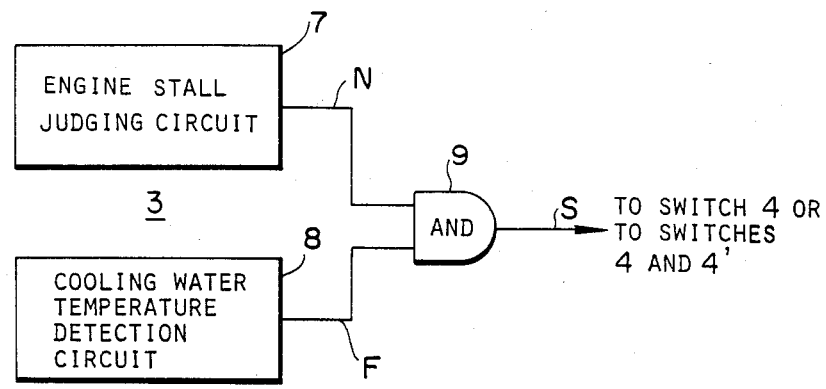
FIGS. 4 and 5 are simplified block diagrams showing two examples of the selector shown in FIGS. 2 and 3.

As shown in FIG. 4, the selector 3 comprises two detectors: an engine stall judging circuit 7 and a cooling water temperature detection circuit 8. The engine stall judging circuit 7 detects when the engine stalls by means of an oil pressure switch of the engine which lights an indicator lamp on the instrument panel of the vehicle in which the engine is mounted, or an electromotive force value of an alternator, or a primary voltage value of an ignition coil of an ignition system, etc. (not shown). The same effect can be achieved by simply using an illumination signal of a charge lamp (indicating an electromotive force of the alternator). The cooling water temperature detection circuit 8 as shown in FIG. 4 is so constructed that a resistance change in a thermistor that senses the engine cooling water temperature converts a corresponding voltage and the voltage is compared with a predetermined reference voltage to determine when the water temperature is below a given temperature. Alternatively, a cooling water temperature switch may be used for the cooling water temperature detection circuit 8.

In FIG. 4, when the engine stalls an output voltage N from the engine stall judging circuit 7 is turned to a high level. When the cooling water temperature is below a predetermined value, an output voltage F is turned to a high level. Therefore, the selection signal S described above is obtained when both high-level voltage signals N and F both appear at the inputs to the AND gate 9.

Figure 5:
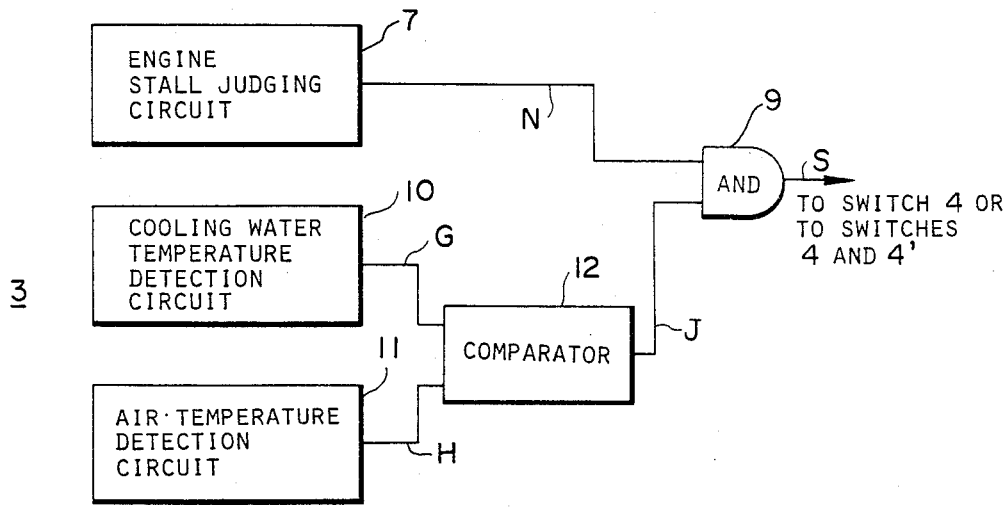

On the other hand, as shown in FIG. 5, the alternative selector 3 comprises: (a) a cooling water temperature detection circuit 10 of a different construction from that shown in FIG. 4; (b) an air temperature detection circuit 11; (c) a comparator 12 which compares an output voltage G corresponding to a cooling water temperature of the engine from the cooling water temperature detection circuit 10 with an output voltage H corresponding to an air temperature from the air temperature detection circuit 11; (d) the engine stall judging circuit 7, and (e) and AND gate circuit 9 which receives the output signals from the comparator 12 and the engine stall judging circuit 7. The function of the engine stall judging circuit 7 in FIG. 5 is the same as shown in FIG. 4. The cooling water temperature and air temperature detection circuits 10 and 11 each comprises a thermistor such that a resistance change in the thermistor, which has a negative resistance characteristic, is converted into the corresponding voltage change.

In FIG. 5, if a difference in temperature between the cooling water temperature and air temperature is determined to be below a predetermined value by means of the comparator 12, the comparator 12 outputs a high-level voltage signal J. The AND gate circuit 9 in turn outputs the selection signal S when both a voltage signal N from the engine stall judging circuit 7 and a voltage signal J from the comparator 12 are at a high level. Consequently, the thermoelectromotive force $V^+ - V^-$ should be zero at that time because cooling water is at air temperature and the engine is stalled, a condition that inherently precludes a temperature difference between the upstream and downstream positions ($T_1-T_2=0$).

Figure 3:
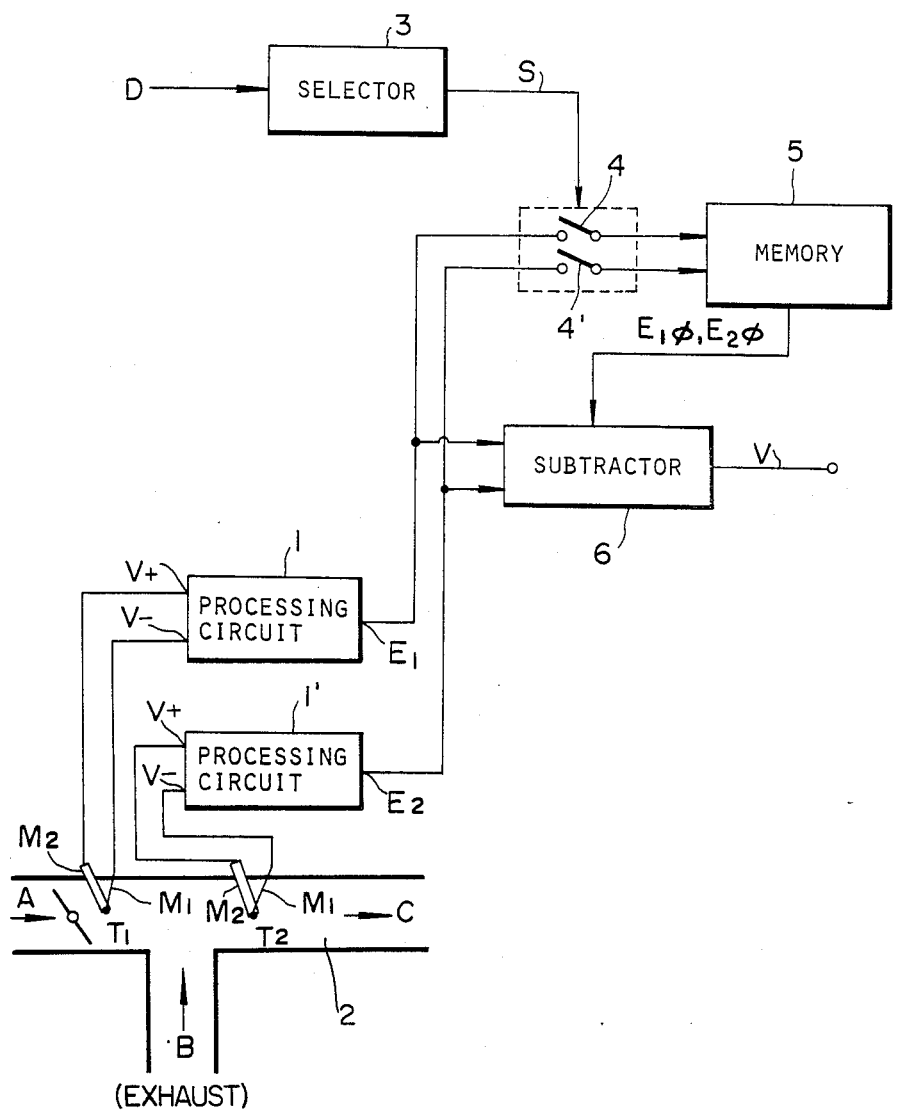
FIG. 3 is a simplified block diagram showing a second preferred embodiment according to the present invention.

FIG. 3 shows a second preferred embodiment according to the present invention.

In this embodiment, two separate temperature difference sensors, e.g., a sensing junction from each of two thermocouples, are placed at respective positions corresponding to the positions shown in FIG. 2 to measure the temperatures $T_1$ and $T_2$ independently. A thermoelectromotive force generated by each thermocouple is sent into each corresponding processing circuit 1 and 1' to obtain a corresponding output voltage $E_1$ and $E_2$. The structure of both processing circuits 1 and 1' is the same as that shown in FIG. 1.

The subtractor 6 receives the two output voltages $E_1$ and $E_2$, respectively, from the processing circuits 1 and 1'. The output voltage $E_1$ from processing circuit 1 is sent into one of a pair of switches 4. The other output voltage $E_1$ from processing circuit 1' is sent to another of the pair of switches 4'. Then, when the selector 3 receives the engine operating parameter signals D and outputs the selection signal S which simultaneously closes the pair of switches 4 and 4', the output voltages $E_1$ and $E_2$ are stored in the memory 5 when the selector 3 determines that the difference between the two thermoelectromotive forces should be zero. That is, S is output when the engine operating parameter signals D indicate a condition that precludes a temperature difference between $T_1$ and $T_2$ so that $\Delta T$ is presumably zero. When the selection signal S is outputted, the output voltages $E_1$ and $E_2$ are stored into the memory 5 as values denoted by $E_1\phi$ and $E_2\phi$, respectively, through the respective switches 4 and 4' for later use.

Alternatively the output correction voltage value $E\phi$, a difference between the two voltage values $E_1\phi$ and $E_2\phi$ determined by the subtractor 6, is stored in the memory 5. Thereafter, the subtractor 6 calculates a corrected output value V in accordance with the equation $E_1-E_2-E\phi=V$ from the current output values $E_1$, $E_2$ of both processing circuits 1 and 1'. The subtractor 6 operates continuously on the received signals to perform the arithmetic operation $E_1-E_2-E\phi=V$.

It should be noted that the selection signal S may, alternately, be produced when the difference between the values of the air temperature H and the intake air temperature $T_1$ measured by means of the first thermocouple and processing circuit 1 are determined to be less than a predetermined value.

Figure 6:
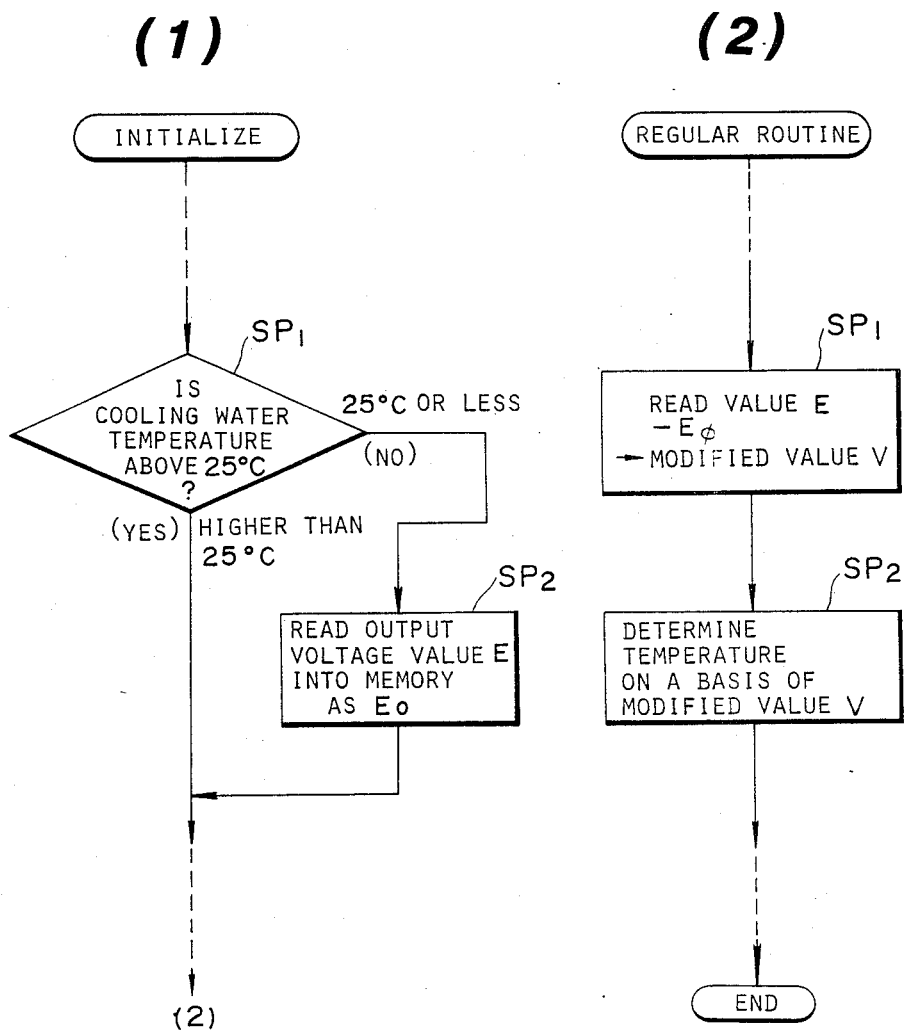
FIG. 6 is a processing flowchart on which a microcomputer is, alternatively, used to execute the temperature difference measurement in place of the circuits shown in FIG. 2, except for the processing circuit 1.
Figure 7:
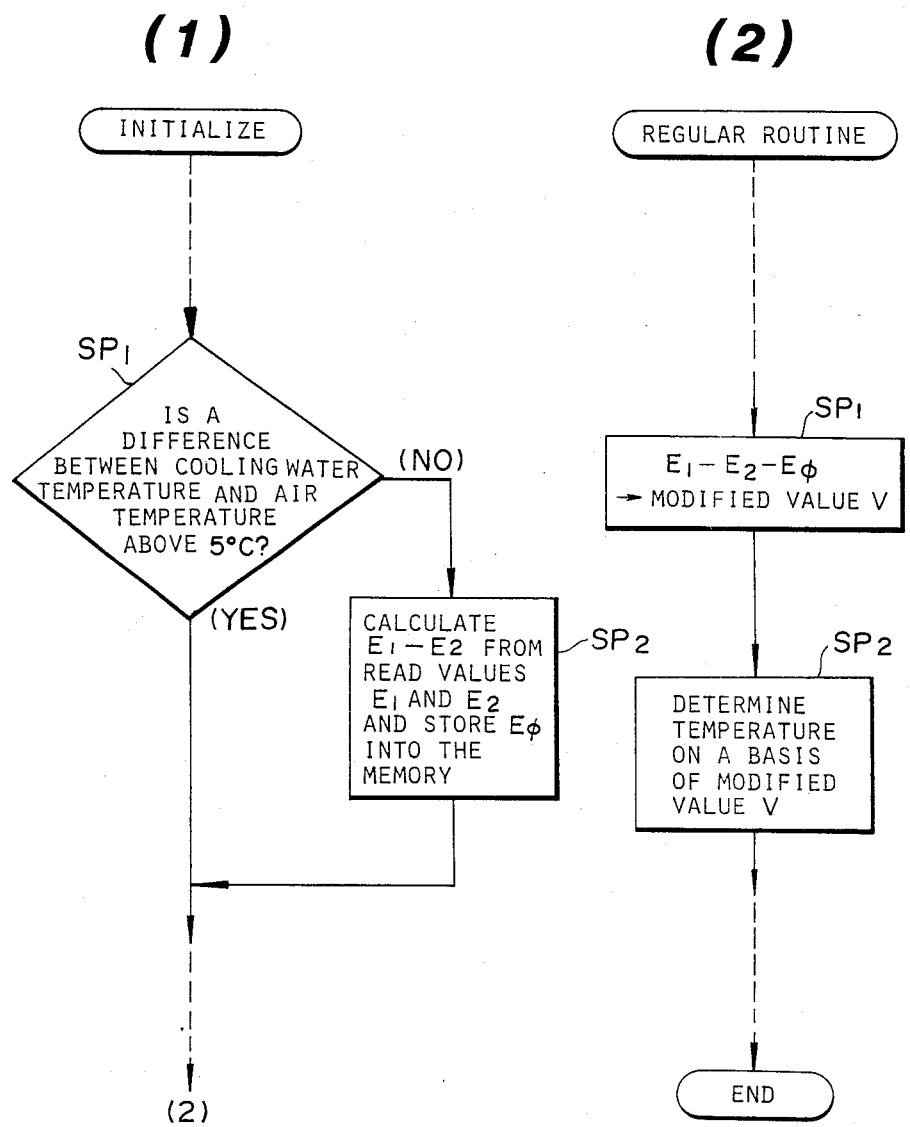
FIG. 7 is another processing flowchart on which a microcomputer is, alternatively, used to execute the temperature difference measurement in place of the circuits shown in FIG. 5, except for the two processing circuits 1 and 1'.

FIGS. 6 and 7 show processing flowcharts when the circuits other than the processing circuit(s) 1(1 and 1') shown in FIGS. 2 and 3, i.e., selector 3, switch(es) 4(4 and 4'), memory 5, and subtractor 6, are replaced with a microcomputer. The microcomputer comprises a clock, an I/O interface circuit, ROM and RAM memory, and a Central Processing Unit (CPU), as is well known.

The selection signal S is generated in an "initialize program" routing (1), a program routine executed before the engine is started, in each figure. In step $SP_1$ of routine (1) of FIG. 6, if the cooling water temperature is at 25° C. or less and the engine stalls then the output voltage E of the processing circuit 1 is read and stored in the computer memory as $E_0$, for the subsequent subtract calculation in step $SP_2$.

In step $SP_2$ of routine (1) of FIG. 7, if the difference between the cooling water and air temperatures is 5° C. or less and the engine stalls, then the difference between the output voltages $E_1$ and $E_2$ from the respective processing circuits 1 and 1' is calculated as $E=E_1-E_2$ and the calculated result (E) is stored as $E\phi$ in the computer memory. It should be noted that the subtraction operation $E-E_0$ (or $E-E\phi$) is executed is step $SP_1$ of a regular processing routine which is routine (2) in both FIG. 6 and FIG. 7 and, thereafter, the corrected temperature difference described hereinbefore is determined on a basis of the modified value V in a step $SP_2$ of routine (2) of both FIGS. 6 and 7.

It is desirable that a nonvolatile memory, i.e., a memory whose contents are not erased when its power supply is turned off, be used as the memory 5 described hereinbefore. For instance, a nonvolatile semiconductor memory device may be used as the memory 5. Alternatively, another DC voltage supply may be used exclusively as a power supply of the memory 5 made of an ordinary volatile semiconductor memory device.

As described hereinbefore, the temperature difference measurement device and method according to the present invention automatically reads an output correction voltage from the processing circuit(s) including the offset error in the temperature sensitive element(s) and processing circuit(s) and the output correction voltage is used to modify the subsequent measured temperature value, whereby any unevenness in the characteristics of the temperature sensitive element(s) or of the temperature measurement device and any aging variation within the device can be compensated to achieve stable and accurate performance by the temperature measurement device.

It will be fully understood by those skilled in the art that the foregoing description is made in terms of the preferred embodiments, and that variations and modifications may be made without departing the scope and spirit of the present invention, which is defined by the appended claims.

What is claimed is:

1. A device for measuring a temperature difference between different positions, comprising:

(a) first means for sensing a temperature difference between the different positions and for producing an output according to the sensed temperature difference between the different positions by utilizing the Seebeck effect, said first means comprising two different kinds of metals constituting a thermocouple, a first junction of the two metals located within an intake pipe of an internal combustion engine for detecting a temperature of intake air and a second junction thereof located downstream of the first junction thereof and interconnected with an exhaust gas recirculation pipe for detecting a temperature of intake air intermixed with exhaust gas from the exhaust gas recirculation pipe, so that a thermo-electromotive force according to the difference in temperature between the first and second junctions as the different positions of the thermocouple is produced;

(b) second means for sensing a predetermined condition which, if the predetermined condition is satisfied, always indicates no temperature difference between said first and second junctions of the thermocouple;

(c) third means for storing the value of the output from said first means when said second means senses said predetermined condition; and (d) fourth means for subtracting the stored value of said third means from the current value of the output produced by said thermocouple so as to obtain a modified value accurately corresponding the current temperature difference.

2. The temperature difference measurement device as set forth in claim 1, wherein said third means comprises a nonvolatile memory, whereby the contents of memory of said third means remains after a power supply is turned off.

3. A temperature difference measurement device as set forth in claim 1, wherein said first means comprises a processing circuit including:
(a) a reference voltage supply ($V_0$);
(b) a first operational amplifier having a non-inverting input terminal connected to the first junction of said thermocouple for receiving a negative side of the thermo-electromotive force $V^-$ and connected to said reference voltage supply via a first resistor $R_0$, an inverting input terminal connected to said reference voltage supply via a second resistor ($R_1$), and an output terminal connected to the inverting input terminal via a third resistor ($R_2$), so that an output voltage ($v_1$) can be expressed as: $v_1 = (1/\alpha)(V^- - V_0 = w_1) + V^- = w_1$, wherein $\alpha$ indicates $R_1/R_2$ and $w_1$ indicates an offset voltage of the first operation amplifier;
(c) a second operational amplifier having a non-inverting input terminal connected to the second junction of said thermocouple for receiving a positive side of the thermoelectromotive force ($V^+$), an inverting input terminal connected to the output terminal of said first operational amplifier via a fourth resistor ($R_3$), and an output terminal connected to the inverting input terminal thereof via a fifth resistor $R_4$, so that an output voltage ($v_2$) can be expressed as: $v_2 = (V^+ - v_1 + w_2) + V^+ + W_2$, wherein $\alpha$ indicates $R_4/R_3$ and $w_2$ indicate an offset voltage of the second operational amplifier;
(d) a third operational amplifier having a non-inverting input terminal connected to the output terminal of said second operational amplifier, an inverting input terminal grounded via a sixth resistor ($R_5$), and an output terminal connected to the inverting input terminal via a seventh resistor ($R_6$) for outputting the voltage corresponding to the sensed termperature difference at the first and second junctions of said thermocouple so that the output voltage (E) can be expressed as: $E = (1 + \beta)(v_2 = w_3)$, wherein $\beta$ indicates $R_6/R_5$ and $w_3$ indicates an offset voltage of said third amplifier,
whereby the output voltage (E) of said processing circuit is finally expressed in such an equation as: $E = (1+\alpha)(1+\beta)(V^+ - V^-) + (1+\beta)\{(-1+\alpha)(w_2 - w_1) + w_3 + V_0\}$.

4. A temperature difference measurement device as set forth in claim 1 or 3, wherein said second means comprises:
(a) an engine stall detection circuit which detects whether the engine stalls and outputs a first signal when the engine stalls;
(b) a cooling water temperature detection circuit which detects whether the engine cooling water temperature is below a predetermined temperature and outputs a second signal when the engine cooling water temperature is below said predetermined temperature; and
(c) an AND gate circuit which receives the first and second signals and outputs an ANDed signal into said storing means so as to store the voltage of said first means when the first and second signals both appear at said gate.

5. A temperature difference measurement device as set forth in claim 1 or 3, wherein said second means comprises:
(a) an engine stall detection circuit which detects whether the engine stalls and outputs a first signal when the engine stalls;
(b) an air temperature detection circuit which detects an air temperature and outputs a third signal corresponding to the detected air temperature;
(c) an engine cooling water temperature detection circuit which detects an engine cooling water temperature and outputs a fourth signal corresponding to the detected engine cooling water temperature;
(d) a comparator which compares said third and fourth signals from said air and cooling water temperature detection circuits and outputs a fifth signal when the difference between the third and fourth signals is below a predetermined value corresponding to a predetermined temperature difference;
(e) an AND gate circuit which receives the first and fifth signals and outputs an ANDed signal into said storing means so as to store the value of the output of said first sensing means when the first and fifth signals both appear at said gate.

6. A temperature difference measurement device as set forth in claim 1, wherein said first means comprises two thermocouples each having different kinds of metals, a first junction of one thermocouple located within an intake pipe of an internal combustion engine for detecting an intake air temperature of the intake pipe from an outside thereof, a second junction of the other thermocouple located within an intake pipe of an internal combustion engine for detecting an intake air temperature of the intake pipe from an outside thereof, a second junction of the other thermocouple located downstream of the first junction and located within an intake pipe interconnected with an exhaust gas recirculation pipe for detecting a temperature of intake air intermixed with exhaust gas, so that each thermocouple produces a thermoelectromotive force according to a difference in the temperature of the intermixed air and exhaust gas from the air temperature and wherein said first sensing means further comprises two processing circuits of the same construction, each processing circuit connected to the corresponding thermocouple.

7. A temperature difference measurement device as set forth in claim 6, wherein said third means stores the value of the output of each of said two processing circuits when said second sensing means senses said predetermined condition.

8. A temperature difference measurement device as set forth in claim 6, wherein said third means stores the value of a difference between the outputs of said two processing circuits when said second means senses said predetermined condition.

9. A temperature difference measurement device as set forth in any one of claims 6, 7, and 8 wherein said second sensing means senses that no difference between the thermo-electromotive forces produced by said two thermocouples exists when the difference between an air temperature and the thermo-electromotive force produced by the first junction of said one of the thermocouples is below a predetermined value.

10. A device for detecting and outputting an electrical signal corresponding to a detected temperature difference of a fluid, comprising:

(a) sensor means having first and second junctions spaced for sensing the temperature difference of the fluid and outputting the electrical signal corresponding to the detected temperature difference, said first sensor utilizing the Seebeck effect;

(b) determination means for determining that output of said sensor means should be zero, said determining means having at least one detector means for detecting a predetermined value associated with said predetermined condition;

(c) a storage means for storing the output signal of said sensor means selectively according to said predetermined condition detector means; and (d) an arithmetic operation means for correcting the output signal of said sensor means using the value of the output signal of said sensor means stored in said storage means.

11. A method of measuring a temperature difference between intake air from an outside of an internal combustion engine and intake air from the outside thereof intermixed with exhaust gas from an exhaust gas recirculation pipe (FIG. 2), comprising the following steps:

(a) producing a thermo-electromotive force according to the temperature difference therebetween using two different kinds of metals constituting a thermocouple, a first junction thereof being located upstream within the intake pipe for receiving intake air from the outside of the engine and a second junction thereof being located downstream of the first junction and within the intake pipe for receiving intake air from the outside and exhaust gas from the exhaust gas recirculation pipe;

(b) amplifying said thermo-electromotive force to produce an output value according to the temperature difference;

(c) storing amplified output value when the engine is stalled and a cooling water temperature of the engine is below a predetermined value difference; and (d) subtracting the stored output value from the current output value when the engine does not stall and the cooling water temperature of the engine is not below said predetermined value so as to obtain a modified output value accurately corresponding to the current temperature difference.

12. A method of measuring a temperature difference between intake air from an outside of an internal combustion engine and intake air from the outside thereof intermixed with exhaust gas from an exhaust gas recirculation pipe, comprising the following steps:

(a) producing two different thermo-electromotive forces according to the temperature difference between intake air from the outside of the engine and air and between intake air from the outside thereof intermixed with exhaust gas using two different kinds of metals constituting two thermocouples, a first junction of one of said two thermocouples being located within the upstream of the intake pipe for receiving intake air from the outside of the engine and a second junction of the other thermocouple being located within the downstream of the intake pipe for receiving intake air from the outside and exhaust gas from the exhaust gas recirculation pipe;

(b) amplifying the two thermo-electromotive forces independently and outputting two respective output voltages each corresponding to the temperature difference from the air;

(c) subtracting the output voltage amplified according to one of the thermo-electromotive forces produced at the second junction of one thermocouple from that amplified according to the other thermo-electromotive force produced at the first junction of the other thermocouple when a temperature difference between cooling water and air temperatures is below a predetermined value; and (d) storing the subtracted output voltage;

(e) subtracting one of the output voltage currently outputted according to one of the thermo-electromotive forces at two spaced-apart temperature sensors produced at the second junction from the other voltage currently outputted according to the other thermo-electromotive force produced at the first junction; and (f) subtracting the stored subtracted output voltage at the step (d) from the subtracted output voltage at the step (e) so as to provide a corrected modified output value corresponding to the measured difference.

13. A device for measuring the temperature of fluid, comprising:

(a) sensor means having first and second junctions for spaced sensing a temperature of fluid and producing a signal corresponding to the temperature difference said sensor means utilizing the Seebeck effect;

(b) determination means for determining that the output signal of said sensor means should be zero in response to a predetermined condition which precludes a temperature difference between said junctions;

(c) amplifier means for amplifying the output signal produced by said sensor means;

(d) storage means for storing the value of the output from said amplifier means when said determination means determines that the output signal of said sensor means should be zero; and (e) subtracting means for subtracting the stored voltage in said storage means from the amplified voltage of said amplifier means so as to obtain a modified output voltage accurately corresponding to the temperature.

* * * * *